Oct. 21, 1952 R. W. JENSEN 2,614,575
TEMPERATURE CONTROLLED OIL SYSTEM
Filed Jan. 25, 1946 2 SHEETS—SHEET 1
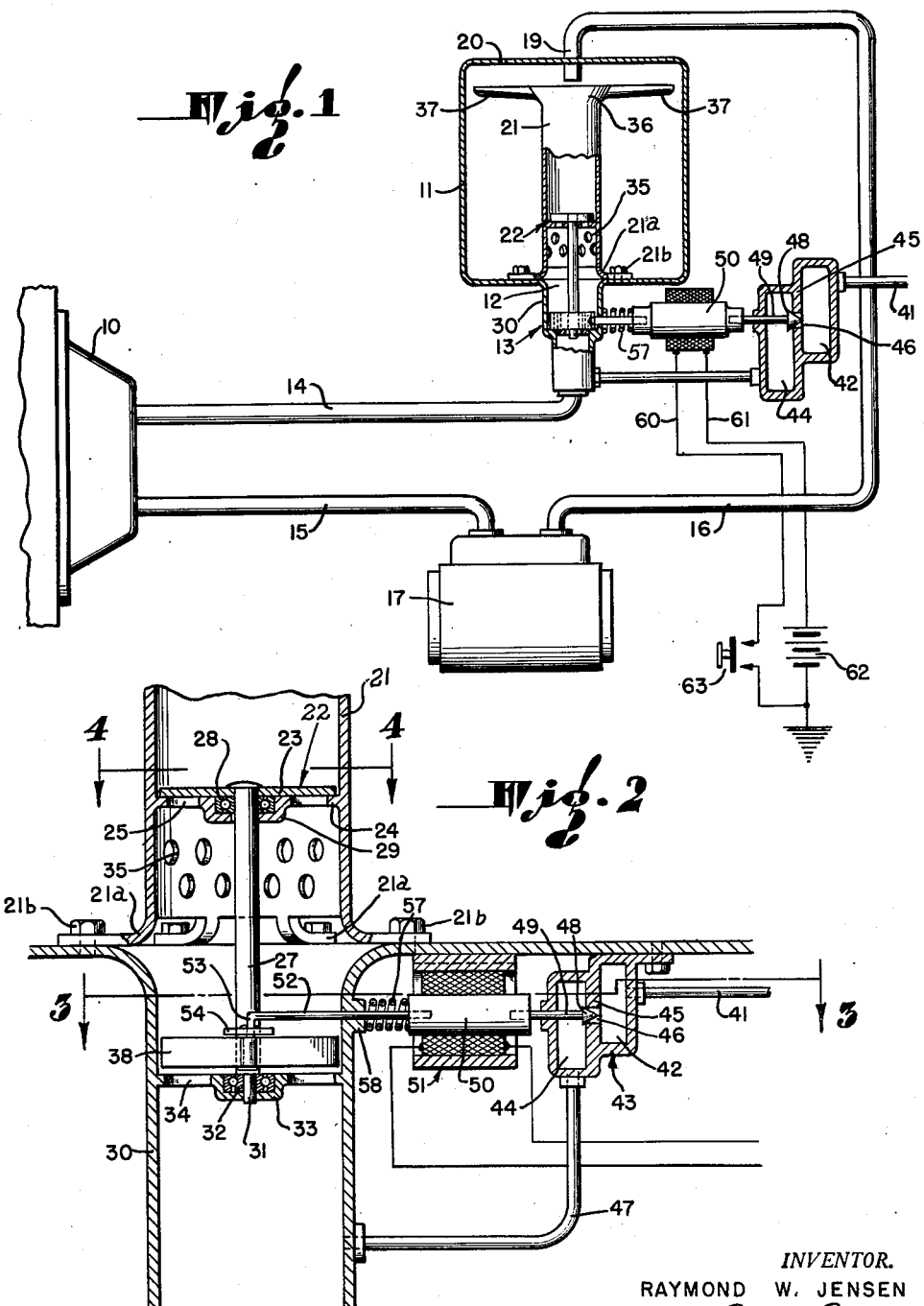
INVENTOR.
RAYMOND W. JENSEN
BY
ATTORNEY Oct. 21, 1952 — R. W. JENSEN — 2,614,575
TEMPERATURE CONTROLLED OIL SYSTEM
Filed Jan. 25, 1946 — 2 SHEETS—SHEET 2
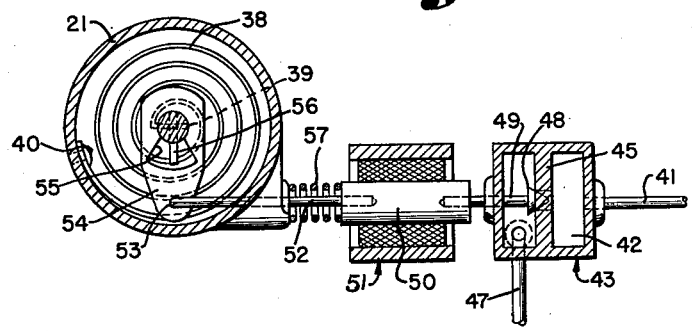
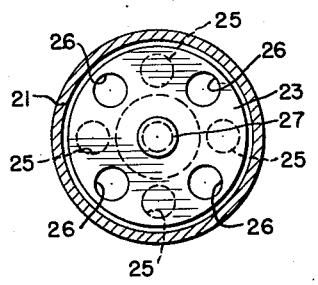 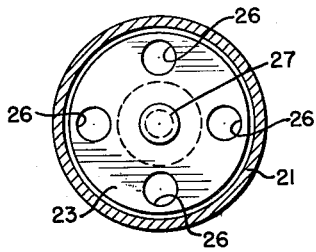
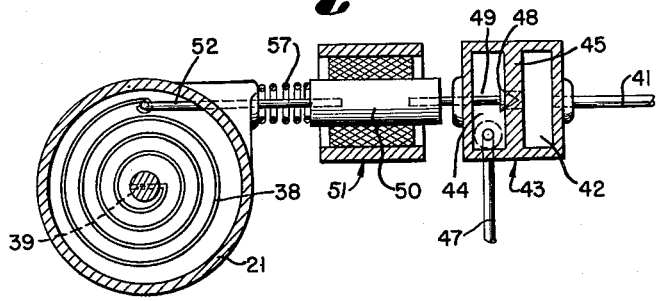
INVENTOR.
RAYMOND W. JENSEN
BY
ATTORNEY Patented Oct. 21, 1952

2,614,575

UNITED STATES PATENT OFFICE 2,614,575

TEMPERATURE CONTROLLED OIL SYSTEM

Raymond W. Jensen, Los Angeles, Calif., assignor to The Garrett Corporation, Los Angeles, Calif., a corporation of California Application January 25, 1946, Serial No. 643,269

12 Claims. (Cl. 137—110)

This invention relates generally to lubrication systems, and more particularly to lubrication systems for internal combustion engines such as are used, for example, in aircraft and the like. While the invention has utility in various types of lubrication systems, it is herein shown and described as embodied in a lubrication system for aircraft engines, and it is an object of the invention to provide a lubrication system wherein the lubricating fluid or oil for the engine is properly conditioned so that adequate and efficient lubrication of said engine may be provided at all times, and starting at low temperatures is facilitated.

This conditioning of the oil by the present invention is effected by providing a reservoir having an outlet connected with the engine and an inlet for returning oil. A conduit, or hopper, is provided in the reservoir which provides a passage between said inlet and outlet through which hot oil may flow directly between said inlet and outlet during the warming-up period of the engine. A diverter valve is provided in the hopper, and controls the flow of oil therethrough, said valve being controlled by a temperature responsive device so that when the oil reaches its normal operating temperature, the valve is closed. The valve is located adjacent the lower end of the hopper, and when closed causes the oil to overflow from the upper end of the hopper, the overflow oil being conveyed outwardly toward the sides or corners of the reservoir to thereby effect rapid warming up of the body of oil in the reservoir.

Another object of the invention is to provide means adjacent the lower end of the hopper and posterior to the valve for admitting into the warm oil stream, limited quantities of oil from the reservoir during the warming up period, to thereby effect a more rapid warming up of the oil in the lubrication system.

Another object of the invention is to provide means for diluting the lubricating fluid or oil to facilitate starting of the engine, and to provide means for effecting said dilution, which means is adapted to effect openings of the diverter valve during the dilution operation.

Further objects and advantages of the invention will be brought out in the following part of the specification.

Referring to the drawings, which are for illustrative purposes only,

Fig. 1 is a diagrammatic or schematic view, partially in section, of a lubrication system embodying the present invention;

Fig. 2 is a partial enlarged diagrammatic sectional view of the diverter valve and dilution valve, and the means for controlling said valve;

Fig. 3 is a sectional view taken on line 3—3 of Fig. 2;

Fig. 4 is a sectional view taken on line 4—4 of Fig. 2, showing the diverter valve in the closed position;

Fig. 5 is a similar view showing the diverter valve in the open position; and

Fig. 6 is a sectional view showing an alternative arrangement of the means for electrically controlling the position of the diverter valve, and opening the dilution valve.

Referring now to Fig. 1, there is shown an engine, indicated generally at 10, having a lubrication system which includes a reservoir 11, having an outlet opening 12 in the bottom thereof, communicating with a depending sump indicated generally at 13, the lower end of which is connected by a conduit 14 which leads to the engine 10. The engine is provided with the usual scavenger pump, not shown, and means is provided for conveying oil from the engine back to the reservoir 11. This means is shown as comprising conduits 15 and 16 between which is interposed an oil cooler 17 which may be of any well known type. The oil cooler may be of a character wherein the hot oil from the engine may either flow through the cooler or conditioning means, or may bypass said cooler, in the well known manner. Return oil, conveyed by conduit 16 is discharged from the open end of the portion 19 of said conduit 16, said portion 19 extending into the reservoir through an inlet opening in the top wall 20 of the reservoir, which is aligned with the outlet port or opening 12.

Within the reservoir there is disposed a tube or hopper 21 having its upper end positioned adjacent the discharge end 19 of the conduit 16. The hopper is aligned with the reservoir inlet and outlet and the lower end has means for attachment to the bottom of the reservoir. As shown, this means comprises arms 21a which are turned outwardly adjacent their ends. These outwardly turned parts of the arms 21a have openings therein for reception of bolts or screws 21b whereby the hopper is secured to the reservoir bottom. The lower end of the hopper is spaced from the outlet 12, and a diverter valve, indicated generally at 22, is located in the lower portion of said hopper. The diverter valve, as best shown in Fig. 2, comprises a rotatable disc 23 which overlies a spider 24, shown as formed integrally with the hopper although it may be otherwise secured thereto, and having openings 25 therethrough (Figs. 2 and 4). The disc 23 is also provided with openings, indicated at 26 in Figs. 4 and 5. The openings in the disc 23 are adapted to register with the openings 25 in the spider, as shown in Fig. 5, when said disc is rotated to a predetermined position, the valve then being open. When said disc is rotated to another position, the openings therein overlie imperforate sections of the spider, at which time the valve is closed. The valve also has a stem 27 which is axially attached to the disc 23 and which depends therefrom. If desired, the valve stem may be provided with bearings to reduce frictional resistance to its movements. As shown, there is a bearing 28, adjacent the upper end of the stem, located in a recess of a central portion 29 of the spider. The lower end of the stem extends into an enlarged portion 30 of the sump 13, and has a reduced end portion 31, received in a bearing 32, located in bearing housing 33 which has radially extending arms 34 formed integrally with the portion 30. However, it is to be understood that the bearing support arms 34 may be a separate member which may be otherwise attached to the wall of the portion 34 as by welding, rivets, bolts, or the like.

The portion of the hopper below the disc 23, as shown in the drawing, may be provided with a plurality of openings 35, the purpose of which will be hereinafter described. Adjacent its upper end, the hopper is flared outwardly at 36 and radially or laterally extending troughs 37 are provided which are adapted to convey diverted oil to the outer portions of the reservoir. If desired, these troughs may be so arranged as to deliver said diverted oil to the corners of the reservoir.

Means for controlling the diverter valve 22 in accordance with temperature, may be provided and, as shown, comprises a coiled bimetallic thermostat 38, the inner end of which is attached to the stem 27 as best shown at 39 in Figs. 3 and 6. In the arrangement shown in Figs. 1, 2 and 3, the outer end of the thermostat is attached by a rivet or screw 40 to the adjacent wall of the portion 30 of the sump. The thermostat is of a type which will expand with a temperature rise.

In the arrangement above described, the thermostat will move the disc 23 to the open position, such as shown in Fig. 5, when temperatures are low. At this time, hot oil passing through the system from the engine, is delivered into the hopper and will pass therethrough into the sump, and thence back to the engine through conduit 14. Thus, when the engine is warming up, a limited quantity of suitable fluid oil will circulate through the system. As the oil passes through the hopper it will effect a heating up of congealed oil adjacent the exterior wall of said hopper. At the same time, limited quantities of relatively cold oil will pass through the openings 35, into the stream of hot oil, and there will also be a certain amount of oil from the reservoir which will enter the stream of hot oil by way of the space between the lower end of the hopper and the bottom of the reservoir.

As the temperature of the oil passing through the sump increases, the thermostat will expand and rotate the disc, first reducing the effective size of the passageways provided by the registered openings 25 and 26, and finally moving the disc 23 to the position, shown in Fig. 4, wherein oil flow through the hopper is entirely stopped. As the valve 22 begins to close and reduce the quantity of oil that may flow past said valve, the oil in said hopper will fill same until it reaches the level of the troughs 37, and will overflow into said troughs. This overflow oil is relatively hot and fluid, and is conveyed by the troughs to the outer portions of the reservoir where it will mix with the cold viscous oil and warm it up. With this arrangement the body of oil in the hopper may be rapidly warmed and decongealed so that it will be in suitable condition to pass to the engine for lubricating the various parts thereof.

Means for diluting the oil in the lubrication system is also provided in order to provide oil of a suitable character to permit ready starting of the engine when the latter is cold. Generally gasoline, or similar fluid, is injected into the oil circulation system immediately prior to the stopping of the engine, in order to provide a sufficiently thin lubricant during the cranking period and initial warming up period. In the present invention, diluting fluid is supplied through a conduit 41 which is connected with a chamber 42 in a valve housing 43. The chamber 42 is separated from an outlet chamber 44 by a wall 45 having a passage 46 therethrough which, when open, provides communication between said chambers 42 and 44. The outlet chamber 44 is connected with the sump by a conduit 47, and the passage or port 46 is controlled by a valve 48 which has a stem 49 connected to an armature 50 of a solenoid, indicated generally at 51. The other end of the armature is provided with a link 52 which is slidably received in an opening provided therefor in the adjacent wall of the sump. The end of the link opposite the armature is downturned at 53, and said downturned end portion is pivotally connected with the outer free end of a lever 54. The opposite end of the lever is provided with an opening through which the valve stem 27 is received, said lever being rotatable on the stem. A slot 55 is provided in the lever 54 adjacent the stem, and a pin 56, which is secured to the stem 27, is received in said slot 55.

The armature 50 is urged to the right, as shown in the drawings, by means of a spring 57 which reacts between one end of the armature and the boss 58 formed integral with the wall of the sump. The spring yieldingly urges the valve 48 to the closed position and at the same time maintains the lever 54 in the position shown in Figs. 2 and 3.

When the lever is positioned as shown in Figs. 2 and 3, the pin 56 is so located in the slot 55, that the thermostat may effect opening and closing of the valve 22 in accordance with the temperature of the oil to which it is exposed.

To effect dilution of the oil in the system, the solenoid is energized, whereupon the armature 50 is moved to the left, as shown in the drawings, and the valve 48 is opened. Simultaneously, the lever 54 is moved in a clockwise direction so that the right-hand end of the slot 55 will engage the pin 56 and positively rotate the valve disc 23 to the open position, such as shown in Fig. 5. When this occurs, diluting fluid will flow into the sump, it being understood that said fluid is supplied under pressure, and the engine permitted to operate for a short time. During this period of time the diluted oil will fill the conduits 14 and 15, the cooler 17, the conduit 16, and the hopper 21. Inasmuch as the valve 22 is open, the main body of oil in the reservoir 11 will not be appreciably diluted as the diluted oil will pass from the conduit 16 through the hopper 21, into the sump, and thence into the engine by way of conduit 14. When the operator has permitted the engine to run a sufficient time to fill the above described circuit with diluted oil, he will cut off the supply of diluting fluid and stop the engine.

The means for energizing the solenoid is shown herein as comprising an electric circuit having wires 60 and 61 which are connected with the solenoid coil. The wire 61 is connected to one pole of a battery 62, and the other wire is connected to the opposite pole of said battery. A switch 63 is interposed in the wire 60 for controlling the solenoid circuit, and said switch is located at some position conveniently accessible to the operator.

In the alternative arrangement shown in Fig. 6, the outer end of the thermostat 38 is operably attached to the link 52. With this arrangement the movement of the armature 50 to the left, as shown in the drawing, will move the thermostat in a counter-clockwise direction, and cause the valve disc to be moved to the open position.

I claim:

1. In a lubricating system for internal combustion engines: an oil reservoir having an inlet adjacent the top thereof and an outlet adjacent the bottom thereof; a substantially vertical hopper in the reservoir adapted to receive lubricating fluid from the reservoir inlet and to discharge same adjacent the outlet, the lower end of said hopper being spaced from said outlet; valve means, including a rotatable valve member, located within the hopper adjacent the lower end thereof; a plurality of openings in the hopper wall downstream of the valve; a plurality of troughs adjacent the upper end of the hopper and adapted to convey oil to remote parts of the reservoir; temperature responsive means for actuating the valve, said temperature responsive means being so located as to be subjected to the temperature of oil leaving the reservoir from the outlet thereof; a source of diluting fluid for injection into oil downstream of the temperature responsive means; a valve for controlling the flow of diluting fluid; means urging the valve to the closed position; electrically controlled means for opening the valve; and a lost motion connection between said electrically operated means and the dilution valve, said connection being so constructed and arranged that the dilution valve will be positively opened when the electrically controlled means functions.

2. In lubricant conditioning and control means: a reservoir for lubricating fluid having an inlet adjacent the top thereof and an outlet adjacent the bottom thereof; a substantially vertical hopper in the reservoir forming a passage between the inlet and outlet; means for controlling the flow of fluid through said passage; temperature responsive means for operating said control means; means for admitting lubricant diluting fluid adjacent the lower end of the hopper; and electrical means for controlling the lubricant diluting means, said electrical means being adapted to also actuate the means for controlling the fluid through the hopper so as to effect a fluid flow therethrough.

3. In lubricant conditioning and control means: a reservoir for lubricating fluid having an inlet adjacent the top thereof and an outlet adjacent the bottom thereof; a substantially vertical hopper in the reservoir forming a passage between the inlet and outlet; a valve for controlling the flow of fluid through the hopper; means for injecting diluting fluid into the lubricant as lubricant leaves hopper; means for controlling the diluting fluid injection means; and a lost motion connection between said diluting control means and the hopper valve, said connection being so constructed and arranged that the hopper valve will open when the diluting control means is actuated to inject diluting fluid.

4. In lubricant conditioning and control means: a reservoir for lubricating fluid having an inlet and an outlet portion; a hopper in the reservoir between the inlet and outlet; valve means in the hopper for controlling the flow of fluid therethrough; temperature responsive means for controlling said valve means; means for introducing diluting fluid into the outlet portion; an electrically operated device for controlling the last mentioned means; and a connection between said device and one end of the temperature responsive means whereby, when said device is actuated, the valve is moved to an open position.

5. In lubricant conditioning and control means: a reservoir for lubricating fluid having an inlet and an outlet; a hopper in the reservoir operably disposed between the inlet and outlet thereof; a plurality of troughs leading from the upper end of the hopper to remote parts of the reservoir, said troughs being adapted to receive lubricating fluid overflowing from the top of the hopper and adapted to discharge said fluid at said remote parts of the reservoir; and temperature responsive means, including a valve adjacent the lower end of said hopper, for controlling the flow of fluid therethrough.

6. In control means for lubricating systems: a reservoir for lubricating fluid having an inlet and an outlet portion, said inlet being adjacent the top of the reservoir and said outlet portion being adjacent the bottom thereof; a substantially vertical hopper in said reservoir operably located between the inlet and outlet thereof; a diverter valve located intermediately of the ends of the hopper for controlling the flow of fluid therethrough; temperature responsive means for controlling said valve, said temperature responsive means being located in said outlet portion; means for introducing diluting fluid into said outlet portion, said means including a dilution control valve; and means, including a lost motion connection, between the dilution and diverter valves whereby the latter will be opened upon opening of the dilution valve.

7. The invention defined by claim 6, wherein the lost motion connection comprises a pin and slot arrangement.

8. The invention defined by claim 6, wherein the dilution valve is controlled by a solenoid.

9. The invention defined by claim 6, wherein there is a spring yieldably urging the dilution valve to the closed position; and there is an electrically controlled device adapted to effect opening of said diverter valve.

10. In a lubricant conditioning system: a reservoir for lubricating fluid having an inlet and an outlet; a hopper in the reservoir operably disposed between the inlet and outlet thereof, said reservoir being vertically disposed; a plurality of troughs adjacent the upper end of said hopper and adapted to receive overflow oil therefrom and conducting said oil to remote parts of the reservoir; and temperature responsive means, including a valve within the hopper, for controlling the flow of fluid therethrough.

11. In a lubricant conditioning system: a reservoir for lubricating fluid, said reservoir having an inlet adjacent the top thereof and an outlet adjacent the bottom thereof; a substantially vertical hopper in the reservoir disposed between the inlet and outlet thereof; a plurality of troughs disposed adjacent the upper end of the hopper and leading therefrom to remote parts of the reservoir; a valve in said hopper for controlling the flow of fluid therethrough; and means for controlling said valve.

12. In a lubricant conditioning and control means: a reservoir for lubricating fluid, said reservoir having an inlet and an outlet; a hopper in said reservoir operably located between the inlet and the outlet thereof; means for conveying overflow oil from the upper end of the hopper to remote parts of the reservoir; temperature responsive means, including a valve adjacent the lower end of said hopper, for controlling the flow of fluid therethrough; and means for diluting the outflowing oil comprising a valve for controlling the introduction of diluting fluid and a connection between said valve and the valve adjacent the lower end of the hopper whereby the latter is moved to an open position when the dilution valve is open.

RAYMOND W. JENSEN.

REFERENCES CITED

The following references are of record in the file of this patent:

UNITED STATES PATENTS

| Number | Name | Date |
|---|---|---|
| 1,924,038 | Herbsman | Aug. 22, 1933 |
| 2,021,282 | Blanchard | Nov. 19, 1935 |
| 2,133,394 | Mortier | Oct. 18, 1938 |
| 2,311,069 | Miller | Feb. 16, 1943 |
| 2,383,878 | Miller | Aug. 28, 1945 |
| 2,408,265 | Miller | Sept. 24, 1946 |
| 2,435,359 | Landis | Feb. 3, 1948 |
| 2,436,513 | Hostetter | Feb. 24, 1948 |